Sept. 20, 1927.

D. L. MIDDENDORF 1,642,741

APPARATUS FOR THE MANUFACTURE OF GLASSWARE

Filed Oct. 3, 1922          2 Sheets-Sheet 1

David L. Middendorf INVENTOR.

BY

Edwin P. Coates ATTORNEY.

Sept. 20, 1927.  
D. L. MIDDENDORF  
1,642,741  
APPARATUS FOR THE MANUFACTURE OF GLASSWARE  
Filed Oct. 3, 1922  
2 Sheets-Sheet 2
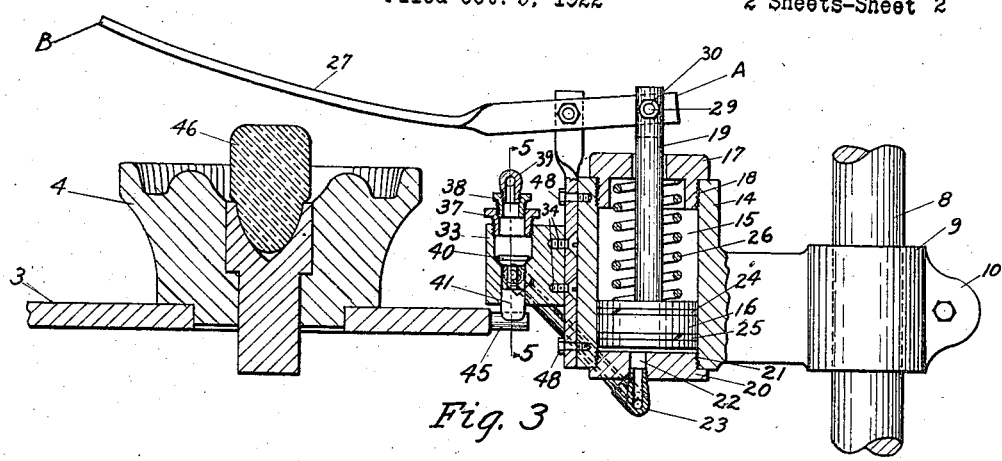
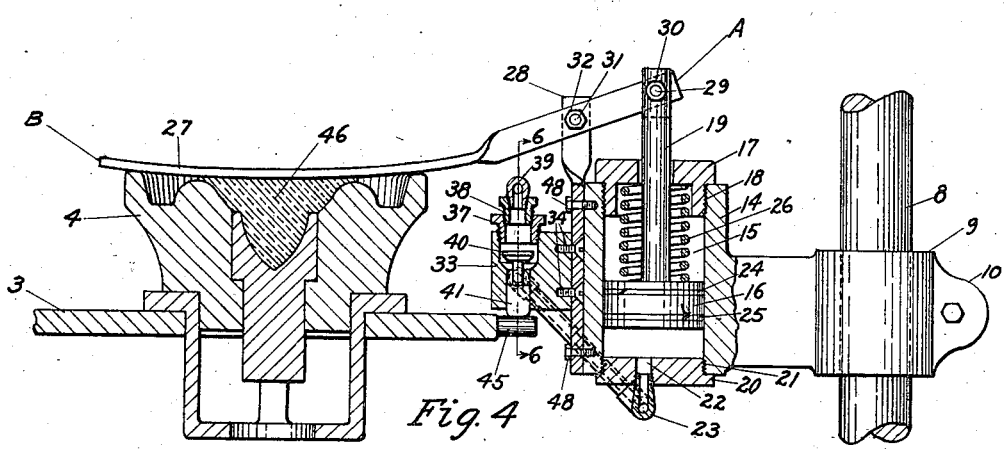
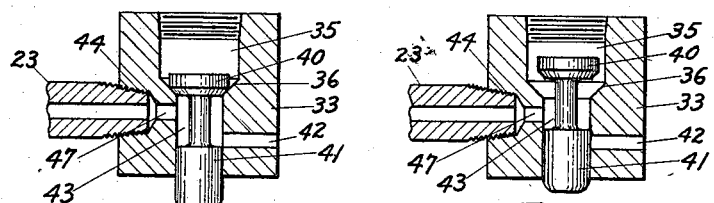
David L. Middendorf INVENTOR.
BY
ATTORNEY.

Patented Sept. 20, 1927.

1,642,741

UNITED STATES PATENT OFFICE.

DAVID L. MIDDENDORF, OF COLUMBUS, OHIO, ASSIGNOR TO THE FEDERAL GLASS COMPANY, OF COLUMBUS, OHIO, A CORPORATION OF OHIO.

APPARATUS FOR THE MANUFACTURE OF GLASSWARE.

Application filed October 3, 1922. Serial No. 592,122.

My invention relates broadly to an improvement in apparatus for the manufacture of glassware by pressing in molds wherein each of a series of molds mounted on a mold table registers intermittently and successively with charging and pressing mechanisms and, more particularly, to an apparatus of this type for the manufacture of shallow glassware in shallow molds wherein means are provided for settling or adjusting the charge of glass in the mold preliminary to its movement into registry with the pressing mechanism so that the forming of a complete glass article is positively insured during the pressing operation.

In the manufacture of shallow glass articles by pressing in shallow molds, such as lemon reamers of the type shown in the drawings annexed hereto, one method is to employ a rotatable mold table having a circular series of equally spaced molds arranged thereon, said table being adapted to be rotated so as to bring each of the molds of the series intermittently and successively into register first with a charging means and then a pressing mechanism. The molds of the type mentioned above may have a deep central cavity into which a plunger moves, said central cavity being surrounded by a laterally extending shallow cavity adapted to receive a portion of a mold ring to form the base of the inverted article in continuation of that part of the article formed by the said central cavity. The pressing mechanism ordinarily employed comprises a vertically operable press plunger adapted to spread the glass in the mold and shape the desired article, the said plunger being movable in a mold ring of such construction as to fit the type of mold employed and form the bottom of the base of the article and being so operable in combination with the plunger that, in movement of the plunger downward toward the mold, the ring is carried with the plunger until it contacts with the mold, whereupon the plunger continues its downward movement to spread the glass in the mold and completely form the article.

In employing the above type of apparatus for the manufacture of glass articles, much difficulty is experienced in producing a fully shaped and commercial article. The difficulty experienced is due to the fact that, in employing a shallow type of mold, when the molten glass is charged into the mold and it is moved rapidly to pressing position, there is not enough time before the mold registers with the pressing mechanism for the glass in the mold to settle or adjust itself to a sufficient level for properly pressing the same to form a fully shaped article. As a result of this, when the rapidly moving mold reaches pressing position and the pressing mechanism is actuated, the molten glass in the mold is at such a height in the mold that the downwardly moving press plunger moves into the glass to such an extent before the mold ring seats on the mold that the molten glass is prematurely forced up around the plunger and between the plunger and the mold ring whereby when the mold ring seats on the mold, the plunger does not make its further and final travel downward into the central cavity of the mold to spread the glass out in the mold to completely form the article because of its choked condition due to the glass between the plunger and the mold ring.

The principal object of my invention is to provide means for settling or adjusting the glass in the mold to a desired height before the pressing mechanism starts to become effective whereupon the forming of a fully shaped and commercial article is positively insured when the pressing mechanism is actuated. A further object of my invention is to provide automatically operated means for accomplishing the above.

Other and further objects of my invention will be apparent as this description progresses and will be brought out in the claims appended hereto. The various objects are preferably attained by the structure illustrated in the drawings wherein similar characters of reference designate corresponding parts in the several figures, and wherein Figure 1 is a plan view showing a portion of the structure employing my invention.

Figure 3 is an enlarged fragmentary sectional view showing the position of my paddle and paddle actuating mechanism and a charge of glass in a mold previous to the operation of the paddle and paddle actuating mechanism.

Figure 4 is an enlarged fragmentary sectional view showing the position of my paddle and paddle actuating mechanism and a charge of glass in a mold upon the operation of the paddle and paddle actuating mechanism.

Figure 5 is an enlarged detail view taken on line 5—5 of Figure 3.

Figure 6 is an enlarged detail view taken on line 6—6 of Figure 4.

Figure 1:
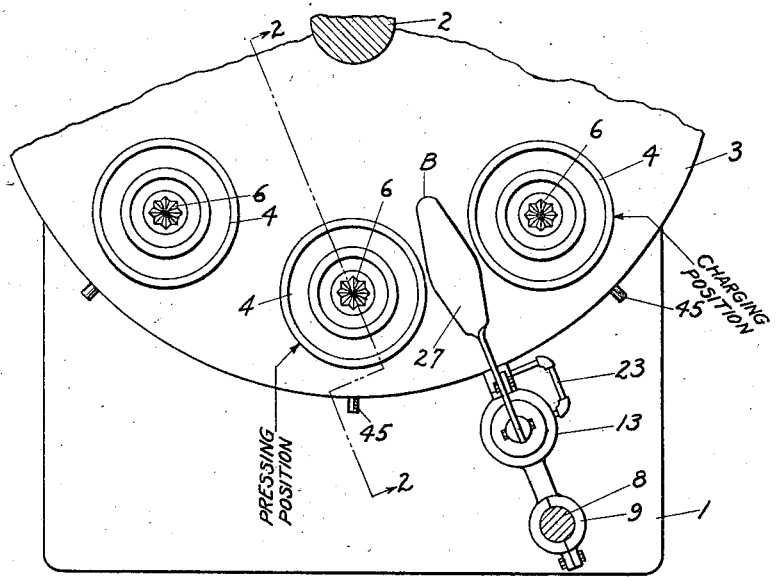
Figure 2:
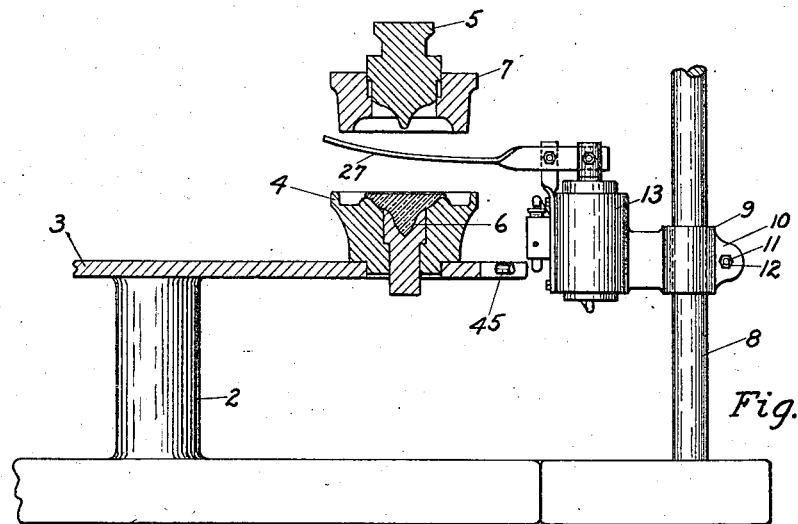
Figure 2 is a vertical sectional view taken on line 2—2 of Figure 1.

In the drawings (Figure 2), 1 represents a base plate which may be of any suitable material and shape. Rigidly mounted upon a central portion of the base plate 1, is a vertical standard 2 adapted to carry at its top a rotatable mold table 3. The mold table 3 may be rotatably secured to the standard 2 by any desired means to suit the conditions of use and is of the type adapted to be rotated intermittently bringing the molds successively to charging position and then to pressing position.

The mold table 3 is adapted to carry upon its upper surface, in any desired manner, one or more concentrically arranged and equally spaced molds 4 for forming glass articles of the desired size and shape, such as lemon reamers as shown in the drawings.

The pressing mechanism (Figure 2), only a part of which is shown, may comprise a vertically movable plunger 5 adapted to be moved downward into the central cavity 6 of the mold 4. The plunger 5 moves through a mold ring 7 which is adapted to seat on the mold 4. The mold ring 7 and plunger 5 are so positioned with relation to each other that as the plunger 5 is moved downwardly the mold ring 7 also moves downwardly until it seats upon the mold 4 whereupon the plunger 5 continues to move downward into the central mold cavity 6 of the mold 4 to completely form the article. It will be readily understood by those skilled in the art that the plunger and ring may be operable as stated or the plunger may be stationary and the mold movable upward, the same relative position and movement existing between plunger and the mold ring. In case the mold is movable upward as stated, the mold construction shown in Figure 4 may be employed. Power mechanism of any suitable known type may be used for moving the parts as above.

The means which I provide in connection with the above described apparatus for accomplishing the settling or adjusting of the glass in the molds before its movement into registry with the pressing mechanism may comprise a vertical standard 8 rigidly mounted on the outer portion of the base plate 1. The standard 8 is adapted to carry a combined paddle and paddle-actuating device which may consist of a collar 9 slidably mounted upon the standard 8 and having outwardly extending flanges 10 adapted to be drawn together by bolt 11 and nut 12 for clamping the said collar 9 to and in place on the standard 8. Integral with the inwardly extending portion of the collar 9 is a paddle actuating cylinder portion 13. This cylinder portion 13 is comprised of a body 14 forming a chamber 15 in which operates the piston 16. The body 14 is provided with a top cover 17 adapted to be sufficiently secured in place on the body 14 by the threaded portion 18 so as to form a tight seal at that point, said cover having an opening in its center permitting the end of the piston stem 19 to extend therethrough as shown in Figures 3 and 4. The body 14 is also provided with a bottom cover 20 adapted to be secured to the body 14 by the threaded portion 21 so as to form a tight seal at that point, said cover having a passage 22 through it for connecting the face of piston 16 with pipe 23 which is secured to the said cover 20 by a suitably provided pipe connection. The piston 16 is provided with grooves containing piston rings 24 and 25 for preventing the passage of air pressure from the face of the said piston to the spring side thereof. A spring 26 is interposed between the inner face of the piston 16 and the top plate 17 for holding the piston 16 in its normal (lower) position, as well as moving said piston to said position when pressure is released from the face of same. The portion of the piston stem 19 which extends through and above the top cover 17 is forked, each of the forked members having suitably provided bolt holes in alignment with each other. The piston end A of the paddle 27 is adapted to be placed between the forked members of the bifurcate portion of the piston stem 19, said end A having a suitably provided drilled hole in the extreme end portion thereof which is adapted to properly align with the drilled hole in each of the forked members of the protruding portion of the piston stem 19. The paddle 27 is pivotally secured to a standard 28 which is, in turn, rigidly secured to the body 14 of the paddle cylinder portion 13 by screws 48. This construction is such that with the end A of the paddle 27 secured in the bifurcate portion of the piston stem 19 by bolt 29 and nut 30 and the paddle 27 pivotally secured to the plate 28 by the bolt 31 and the nut 32, when the piston 16 carrying its stem 19 is moved upward the piston end A of the paddle 27 will likewise be moved upward, in turn, moving the outer end B of the paddle 27 downward. The paddle 27 is so constructed and placed and has its actuating mechanism so adjustable by movement of the collar 9 on the standard 8 that the end B of the paddle 27 will extend above and over the path of the molds 4 located on the mold table 3 so that when the end B of the paddle 27 is moved downward, at the time of mold registry therewith, it will strike the glass in the mold. The outer periphery of the mold 4 serves as a positive paddle stop preventing the paddle 27 from striking the mold ring seating portion and injuring same.

I employ, preferably, air pressure for moving the piston 16 to its upper position so as to lower the end B of the paddle 27. To control the admission of air pressure to and exhaust from the face of the piston 16, I provide a valve structure, Figures 3 to 6 inclusive, which may consist of a body 33 rigidly secured to the plate 28 by screws 34, (Figures 3 and 4). The body 33 contains a valve chamber 35, the lower portion of which is shaped so as to form a valve seat 36. The top of the valve chamber 35 is closed by the cap 37 having a suitably provided pipe connection 38 to which is connected pipe 39 leading to an air supply (not shown). The valve chamber 35 contains a valve 40 having a stem 41 serving as a valve guide and extending through and below the body 33 as shown in Figures 5 and 6. The extreme end of the valve guiding stem 41 extending below the body 33 is shaped, preferably rounded as shown, to permit a free sliding movement of same over any correspondingly shaped object which may contact therewith. The diameter of that part of the valve guiding stem 41 immediately below the valve 40 and extending downward therefrom to the lower edge of the inner opening of exhaust passage 42, Figures 5 and 6, is less than that part of said stem extending on through and below the body 33 thereby forming an annular chamber 43 which is connected in the seated (normal) position of valve 40 to atmosphere by way of exhaust passage 42. Valve body 33 also has pipe connection 44 connected to the annular chamber 43 around the stem 41 at such a point that when the valve 40 is unseated and the valve stem accordingly moved upward closing the exhaust passage 42, as shown in Figure 6, the pipe connection 44 is still connected to the annular recess 43 and, in turn, to the valve chamber 35 and air supply through pipe 39. One end of pipe 23 is secured in the pipe connection 44 in the well known manner, thereby connecting the said annular chamber 43 to the face of the paddle operating piston 16 by way of the said pipe 23 and passage 22 in the bottom cover 20 of the portion 13.

To provide for the operation (unseating) of the air valve 40, the mold table 3 is provided with trip lugs 45 suitably secured in place to the outer edge of table 3, there being one for each mold 4 and so placed that it is in alignment with the central standard 2 and the mold 4. During the movement of table 3 from charging to pressing position the trip lug 45 will contact with the protruding portion of the valve stem 41 and move it upward unseating valve 40.

In operation, a charge of molten glass 46 having been deposited in the mold 4 in filling position, the mold table 3 is rotated so as to bring the charged mold into registry with the pressing mechanism. During the movement of the charged mold 4 from charging to pressing position, the trip lug 45, which is suitably secured to the mold table 3 directly opposite the mold 4, contacts with the protruding end of the valve stem 41 which slidably engages the said trip lug 45 and is moved upward. When the valve stem 41 is moved upward, valve 40 is unseated and the exhaust passage 42 is closed by the close fitting part of the said stem 41 as shown in Figure 6. The passage 47 leading from annular chamber 43 around stem 41 to the pipe connection 44 remains open and, upon the unseating of the valve 40 as stated, air pressure from the air supply (not shown) flows through pipe 39 into valve chamber 35 and thence past valve 40 into passage 47 and pipe 23 to the face of the piston 16. When a predetermined amount of pressure builds upon the face of the piston 16, the resistance of the spring 26 is overcome whereupon the piston 16 is moved upward, in turn carrying its stem and the end A of paddle 27 upward. When end A of the paddle 27 is moved upward, the end B of same is, in turn, moved downward causing the paddle to strike the molten glass in the mold registering therewith as shown in Figure 4 whereupon the molten glass is flattened, settled or adjusted to a lower level in the mold. This action is very rapid and snappy because the movement of a mold table of the type described is comparatively rapid and the time of the trip lug 45 contacting with the valve stem 41 is very short.

As soon as the mold table 3 moves so as to carry the trip lug 45 out of contact with the valve stem 41, air pressure on the top of the valve 40 by way of the pipe 39 plus gravity moves the valve 40 to its seat 36 thereupon cutting off the supply of air pressure to the face of the piston 16 by way of the pipe 23 and, in turn, moving the valve stem 41 so as to uncover the exhaust passage 42, Figure 5, thereby venting the face of the piston 16 to atmosphere by way of the pipe 23, passage 47, annular recess 43 and exhaust passage 42. As the pressure is vented from the face of piston 16, the spring 26 moves the piston 16 to its lower (normal) position, in turn, lowering the end A of the paddle 27 and raising its end B as shown in Figure 3. The above operation is repeated each and every time that a mold is moved from charging to pressing position.

From the foregoing description it is obvious that the objections hereinbefore stated as prevalent in the art are overcome, and adequate means are provided for settling or adjusting the glass in the mold to a desired height and shape before the mold registers with the pressing mechanism thereby positively insuring the forming of a full shaped and commercial article; and that the means employed are automatically controlled by movement of the mold table and in timed relation therewith.

A very important aspect of my invention is that it makes possible the handling of charges of the type referred to herein automatically, whereas hitherto it has only been feasible to produce this class of ware by way of a hand feed. The importance of this can not be over-estimated.

Although I have described with considerable particularity the various details of the structure which I have selected to illustrate my invention, yet changes therein may be made by those familiar with the art without departing from the scope of my invention as disclosed by the following claims.

What I claim is—

1. In combination with apparatus for pressing glass articles embodying successively presented molds, a pressing plunger, and a means for hastening settling of the charge after delivery and before operation of the pressing plunger, said plunger and said means being caused to contact the charge of glass in the mold from the same side.

2. In combination with apparatus for pressing glass articles embodying successively presented molds and a pressing plunger, a means for spanking the charge of glass protruding from the top of the mold after delivery and before pressing to hasten settling.

3. In combination with glass receiving and forming apparatus, paddle means for applying a settling force to the charge in between receiving and forming.

4. In combination with glass receiving and forming apparatus, automatically actuated paddle means for applying a settling force to the charge in between receiving and forming.

5. An apparatus of the type described comprising a mold table having any number of molds mounted thereon and adapted to present each mold successively to a charging and then to a forming mechanism, pressure actuated paddle means for settling the glass in the mold during its movement from charging to forming position, and means located on the said table for controlling the said pressure actuated mechanism.

6. In an apparatus for the manufacture of glassware, the combination with a rotatable mold table having any desired number of molds mounted thereon in a circular series and adapted to carry each mold successively from a charging to a forming position, of a reciprocating paddle extending above the said table and over the mold path thereof and being movable downward into contact with the glass in the mold while it is moving from charging to forming position, the movement of the said paddle downward being controlled by the movement of the said mold table and in timed relation thereto.

7. In an apparatus of the type described, the combination of a rotary mold table, one or more equally spaced molds mounted on said table and adapted to be moved in succession from a charging to a forming position, reciprocating paddle means placed so as to extend over and above the path of said molds for contacting with and settling the glass in said molds while they are moving from charging to forming position, the movement of the said reciprocating means being controlled by movement of the said mold table.

In testimony whereof I hereby affix my signature.

DAVID L. MIDDENDORF.